United States Patent
Cheng et al.

(10) Patent No.: US 10,348,026 B1
(45) Date of Patent: Jul. 9, 2019

(54) CONNECTOR PROTECTION DEVICE WITH AUTOMATIC CLOSING FUNCTION

(71) Applicant: Getac Technology Corporation, Hsinchu County (TW)

(72) Inventors: Kuo-Heng Cheng, Taipei (TW); Juei-Chi Chang, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 0 days.

(21) Appl. No.: 16/157,254

(22) Filed: Oct. 11, 2018

(51) Int. Cl.
*H01R 13/447* (2006.01)
*H01R 13/453* (2006.01)

(52) U.S. Cl.
CPC ....... *H01R 13/447* (2013.01); *H01R 13/4532* (2013.01)

(58) Field of Classification Search
CPC ............................ H01R 13/447; H01R 13/453; H01R 13/4532; H01R 13/4536; H01R 13/4538
See application file for complete search history.

(56) References Cited

U.S. PATENT DOCUMENTS

| | | | | |
|---|---|---|---|---|
| 6,896,530 B2 * | 5/2005 | Nishio | ............... | H01R 13/4534 439/137 |
| 6,935,873 B2 * | 8/2005 | Funatsu | ............ | H01R 13/4532 439/137 |
| 7,445,472 B1 * | 11/2008 | Huang | ............... | H01R 13/4536 439/138 |
| 9,653,842 B2 * | 5/2017 | Savage | ............. | H01R 13/5213 |
| 10,248,162 B1 * | 4/2019 | Cheng | .................. | G06F 1/1632 |
| 2017/0117729 A1 * | 4/2017 | Hirose | ................. | H01R 13/629 |
| 2017/0302024 A1 * | 10/2017 | Morrison | ........... | H01R 13/6315 |
| 2018/0309222 A1 * | 10/2018 | Ferran Palau | ..... | H01R 13/4536 |

* cited by examiner

*Primary Examiner* — Ross N Gushi
(74) *Attorney, Agent, or Firm* — Locke Lord LLP; Tim Tingkang Xia, Esq.

(57) ABSTRACT

A connector protection device includes a base plate, two connectors assembled at the base plate, a pivot shaft assembled at the base plate, a protection cover, a torsion spring assembled at the pivot shaft and a pressing button. The protection cover includes a connecting portion assembled at the pivot shaft and two covers, wherein each of the covers corresponds to one of the connectors. The torsion spring has one end abutting against the base plate and the other end abutting against the connecting portion. The pressing button is provided between the two covers, and has one end abutting against the connecting portion. The torsion spring applies a force on the connecting portion such that the covers tilt above and cover the connectors. When pressed downwards, the pressing button pushes the connecting portion to rotate in reverse, further driving the covers to rotate in reverse to expose the connectors.

13 Claims, 8 Drawing Sheets

CONNECTOR PROTECTION DEVICE WITH AUTOMATIC CLOSING FUNCTION

BACKGROUND OF THE INVENTION

Field of the Invention

The present invention relates to connector protection devices and, more particularly, to a connector protection device with an automatic closing function.

Description of the Prior Art

An electronic device serving as a docking station is currently available. Such docking station may act as a bridge between a desktop computer and a mobile device, and includes a housing, a connector and an electronic circuit module. The electronic circuit module is arranged in the housing, and is connected to the desktop computer through a signal wire. The connector is for connecting the electronic circuit module, and is fixed on the housing and exposed from the housing. A mobile device such as a laptop computer or a tablet computer may be mounted on the docking station, and a corresponding connection interface on the mobile device may be connected to the connector of the docking station. Thus, the mobile device can be signally connected to the desktop computer through the docking station.

For ease of use, a connector of a common docking station is kept in a state of being constantly exposed outside a housing. To mount a mobile device, a user is only required to align a connection interface of the mobile device with the connector of a docking station and slightly apply a force to press the mobile device downwards, and the mobile device is then mounted on the docking station and becomes connected to the connector. To remove the mobile device, a user can remove the mobile device by slightly applying a force to lift the mobile device.

SUMMARY OF THE INVENTION

As previously described, in the above electronic device serving as a docking station, a connector thereof is kept in a state of being constantly exposed outside a housing for ease of use. In the above situation, the exposed connector lacks protection and can be easily damaged when encountering a collision. In addition, dust can be easily accumulated in the connector, and an excessive amount of dust causes a negative effect on the electrical connection between the connector and a mobile device, resulting in unstable signal or connection failure.

In view of the above, it is an object of the present invention to provide a connector protection device having an automatic closing function, so as to achieve protection over a connector on condition that ease of use is maintained.

In one embodiment of the present invention, a connector protection device having an automatic closing function includes a base plate, two connectors, a pivot shaft, a protection cover, a torsion spring and a pressing button. The two connectors are assembled at the base plate. The pivot shaft is assembled at the base plate. The protection cover includes a connecting portion and two covers, wherein the connecting portion is assembled at the pivot shaft, and each of the covers corresponds to one of the connectors. The torsion spring is assembled at the pivot shaft, and has one end abutting against the base plate and the other end abutting against the connecting portion. The pressing button is provided between the two covers, and has one end abutting against the connecting portion. The torsion spring applies a force on the connecting portion such that the covers tilt above and cover the connectors. When the pressing button is pressed downwards, the pressing button pushes the connecting portion to pivotally rotate in reverse, further driving the covers to pivotally rotate in reverse to expose the connectors.

In one embodiment of the present invention, the connector protection device further includes two positioning columns. The two positioning columns are assembled on the base plate, and are respectively located between the two connectors and the pressing button.

In one embodiment of the present invention, the base plate includes a limiting portion which is located between the two connectors, and the pressing button is movably provided in the limiting portion.

Further, the limiting portion and the connecting portion are connected to the pivot shaft, and the connecting portion is configured to rotate by taking the pivot shaft as an axis. The limiting portion includes a limiting column, and the pressing button is sleeved on the limiting column. The limiting portion further includes two side plates and a bridge plate, wherein the bridge plate is located between the two side plates, the two side plates are connected to the base plate, and the limiting column is provided on the bridge plate.

In one embodiment of the present invention, the connecting portion includes a first support arm, and the pivot shaft is connected to the first support arm.

Further, the first support arm includes a first protruding column, the torsion spring is sleeved on the pivot shaft, and one end of the torsion spring encircles the first protruding column. Moreover, the first support arm is in a quantity of two, the pivot shaft is in a quantity of two, the two pivot shafts are respectively connected to the two first support arms, and the pressing button is located between the two first support arms and the two pivot shafts.

Furthermore, the connector protection device further includes an outer pivot shaft, the connecting portion includes a second support arm, the base plate and the second support arm are connected to the outer pivot shaft, and the outer pivot shaft and the pivot shaft are coaxial. In addition, the second support arm is in a quantity of two, the outer pivot shaft is in a quantity of two, the two outer pivot shafts are respectively connected to the two second support arms, and the two first support arms are located between the two second support arms.

In one embodiment of the present invention, the connecting portion includes a third support arm that includes a second protruding column, and one end of the pressing button abuts against the second protruding column.

Further, the third support arm is in a quantity of two, the two second protruding columns extend from the respective third support arms and towards each other, and one end of the pressing button abuts against the two second protruding columns.

In conclusion, a connector protection device according to embodiments of the present invention provides ease of use and is capable of reliably protecting a connector. When a connector is not in use, this protection device is capable of avoiding the connector from damages caused by collisions as well as preventing dust from accumulating in the connector.

Features and advantages of the present invention are described in detail in the detailed description below. The disclosure is sufficient for a person skilled in the art to understand and accordingly implement the technical contents of the present invention. Furthermore, on the basis of the contents, claims and drawings disclosed by the application, a person skilled in the art can easily appreciate objects and advantages related to the present invention.

DETAILED DESCRIPTION OF THE EMBODIMENTS

Figure 1:
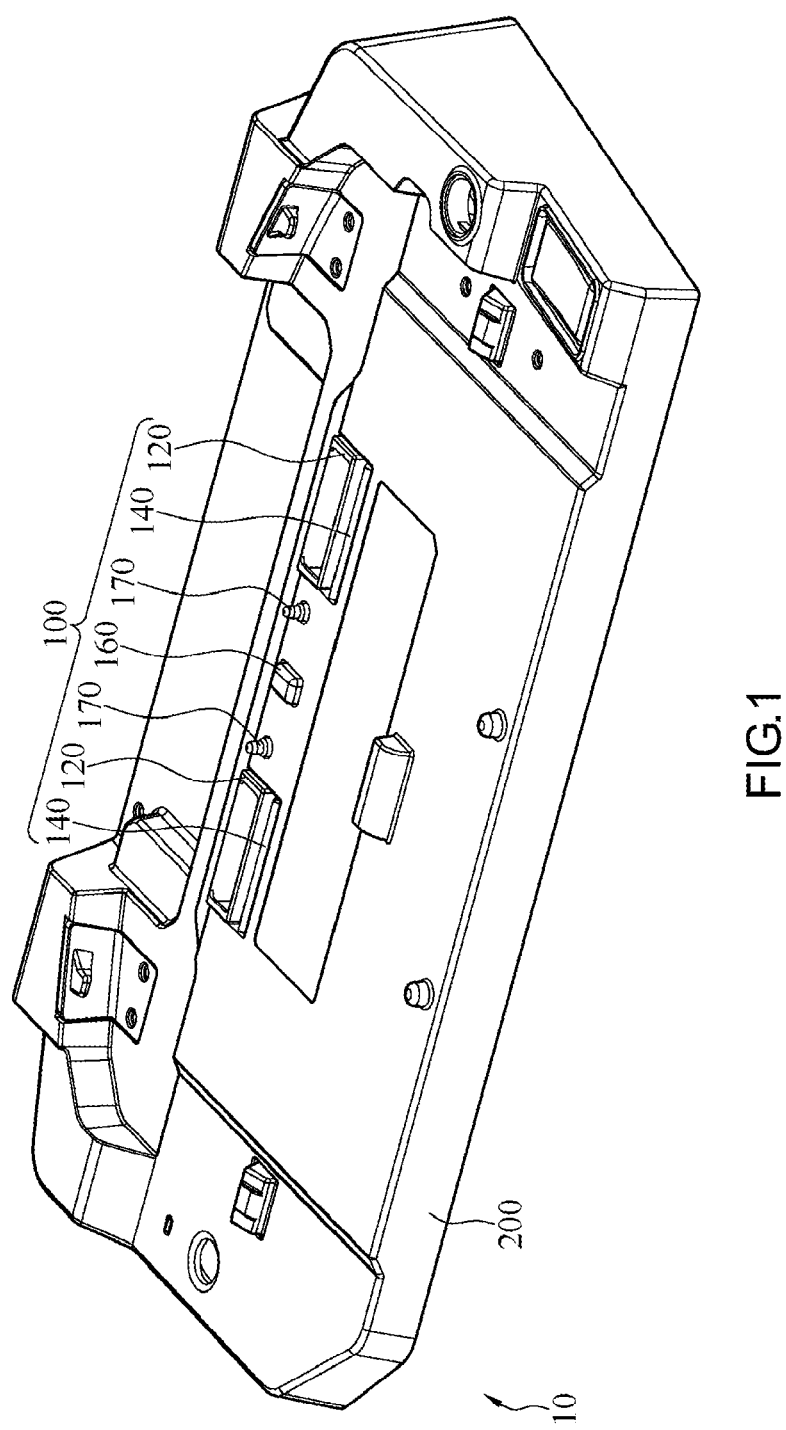
FIG. 1 is a schematic diagram of an electronic device according to an embodiment of the present invention.

Refer to FIG. 1. FIG. 1 is a schematic diagram of an electronic device 10 according to an embodiment of the present invention. In this embodiment, the electronic device 10 is, for example but not limited to, a docking station for a mobile device. The electronic device 10 includes a connector protection device 100 and a housing 200. The connector protection device 100 includes a connector 120 that is fixed at the housing 200 and is exposed from the housing 200. Moreover, the connector 120 may further be connected to an electronic circuit module (not shown) disposed in the housing 200. A mobile device corresponding to the electronic device 10 may be placed on the housing 200 of the electronic device 10, and a connection interface of the mobile device may be connected to the connector 120, such that mobile device is electrically connected to the electronic circuit module in the housing 200.

Figure 2:
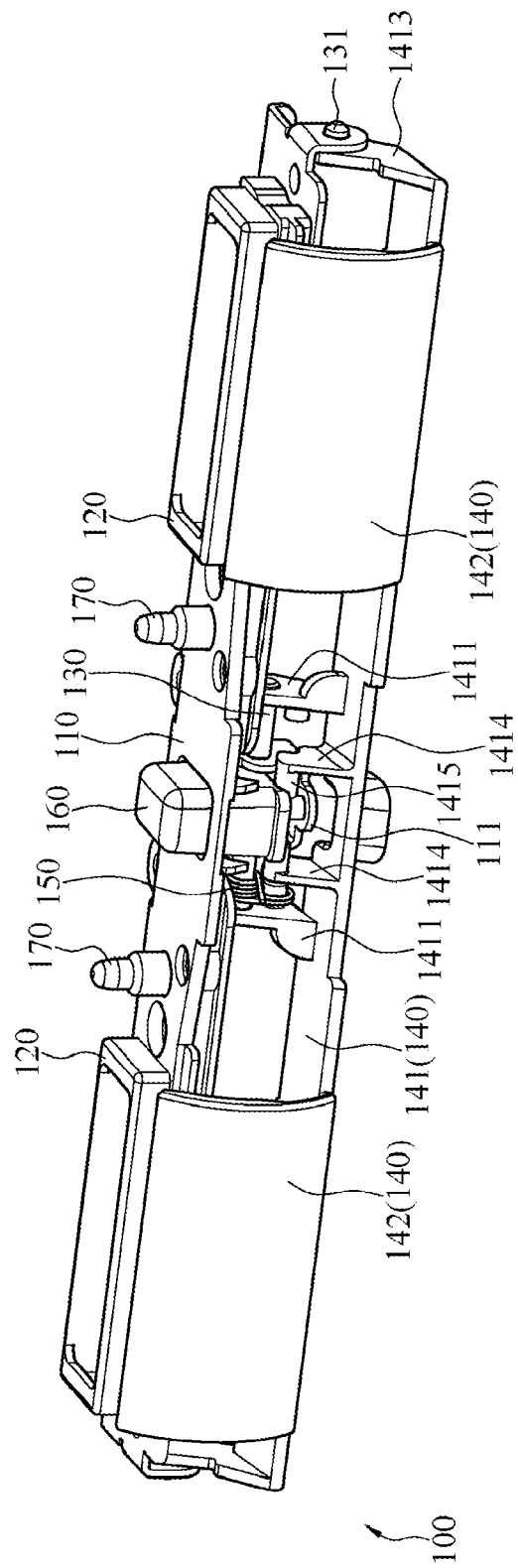
FIG. 2 is a schematic diagram of a connector protection device of the electronic device in FIG. 1.
Figure 3:
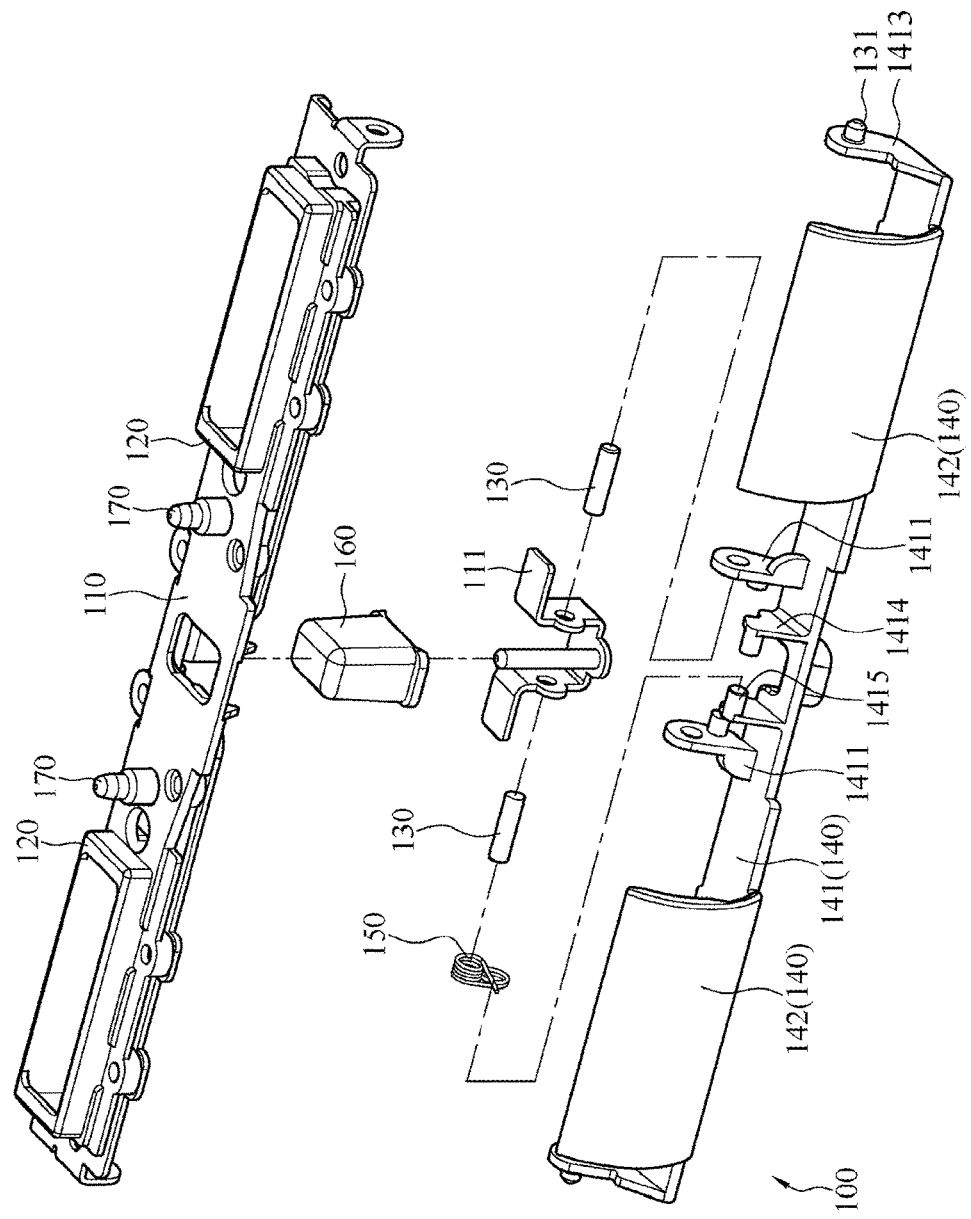
FIG. 3 is an exploded view of the connector protection device in FIG. 2.
Figure 4:
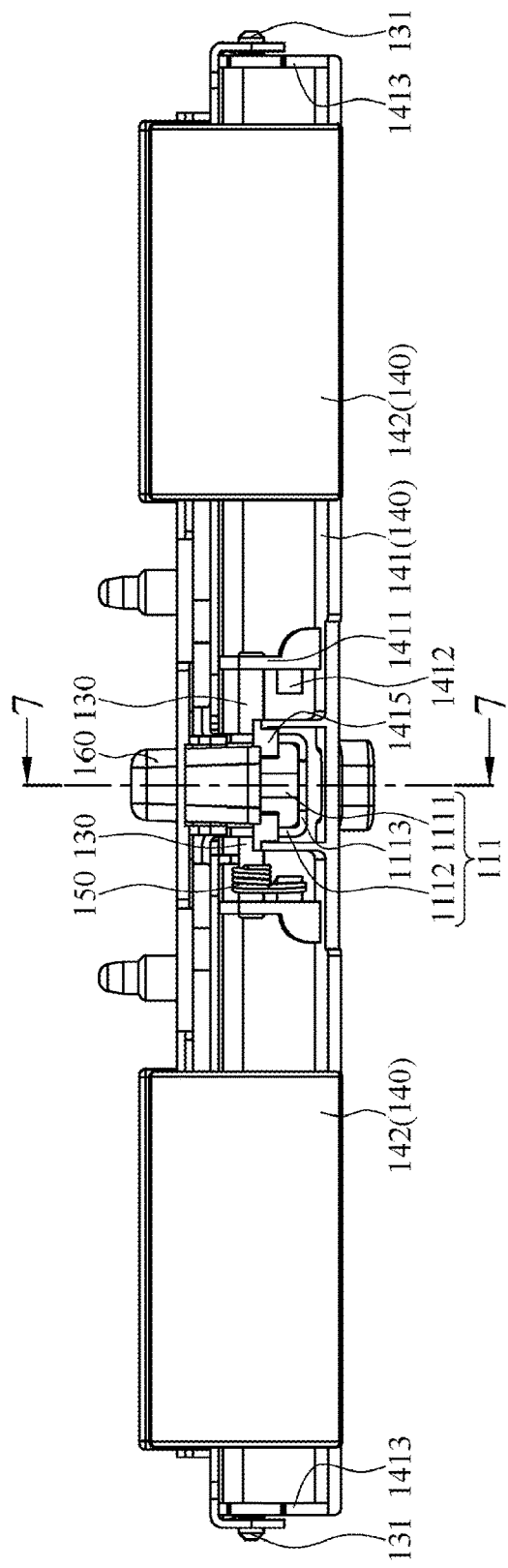
FIG. 4 is a front view of the connector protection device in FIG. 2.

Refer to FIG. 2, FIG. 3 and FIG. 4. FIG. 2 shows a schematic diagram of the connector protection device 100 of the electronic device 10 in FIG. 1. FIG. 3 shows an exploded view of the connector protection device 100 in FIG. 2. FIG. 4 shows a front view of the connector protection device 100 in FIG. 2. Furthermore, the connector protection device 100 in FIG. 1 to FIG. 4 is in an open state, with associated structural details and principles to be described hereinafter. As shown in FIG. 1 to FIG. 4, in this embodiment, the connector protection device 100 has an automatic closing function, and includes a base plate 110, two said connectors 120, a pivot shaft 130, a protection cover 140, a torsion spring 150 and a pressing button 160. The base plate 110 is fixed in the housing 200, and the two connectors 120 are assembled at the base plate 110 and exposed from the housing 200. The foregoing mobile device may be placed on the housing 200, and is connected to the two connectors 120 through the foregoing connection interface.

As shown in FIG. 2 to FIG. 4, in this embodiment, the pivot shaft 130 is assembled at the base plate 110, and is located between the two connectors 120. The protection cover 140 includes a connecting portion 141 and two covers 142. The two covers 142 extend from one side of the connecting portion 141, and are arranged at an interval from each other. The connecting portion 141 is assembled at the pivot shaft 130, and each of the covers 142 corresponds to one of the connectors 120. The connecting portion 141 can pivotally rotate through the pivot shaft 130 by taking the pivot shaft 130 as a rotation axis, and the covers 142 rotate along with the connecting portion 141. In overall, the protection cover 140 can rotate relative to the base plate 110 and the connectors 120. When the connecting portion 141 pivotally rotate in a forward direction or a reverse direction according to the pivot shaft 130, the covers 142 pivotally rotate in a forward direction along with the connecting portion 141 to a closed position to cover the connectors 120, or the covers 142 pivotally rotate in a reverse direction along with the connecting portion 141 to an open position to expose the connectors 120. The expression "pivotally rotating in a forward direction" and "pivotally rotating in a reverse direction" are for indicating that the directions of the pivotal rotation are opposite, and are not to be construed as being limited to any specific direction.

Figure 8:
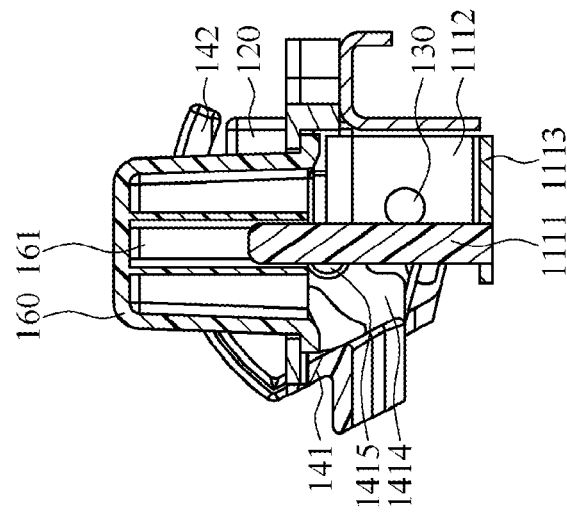
FIG. 8 is a cross-sectional view of a protection cover of the connector protection device in FIG. 7, wherein the protection cover is in a closed state.

In this embodiment, the torsion spring 150 is assembled at the pivot shaft 130. For example, one end of the torsion spring 150 abuts against the base plate 110, and the other end of the torsion spring 150 abuts against the connecting portion 141. The torsion spring 150 is configured in a way that it persistently generates an elastic restoring force due to elastic deformation, and the elastic restoring force is persistently applied on the connecting portion 141, such that the connecting portion 141 drives the two covers 142 to cause the two covers 142 to tilt above and cover the connectors 120. That is to say, in a normal state when the entire system does not receive an external force, the covers 142 receives the stress persistently applied by the torsion spring 150 and is kept at the closed position to cover the connectors 120 (the closed position of the covers 142 is shown in FIG. 6 and FIG. 8, with associated details to be provided shortly below).

In this embodiment, the pressing button 160 is provided between the two covers 142, and the pressing button 160 is thus correspondingly located between the two connectors 120. The pressing button 160 passes through and is movably provided at the base plate 110 and the housing 200, wherein one part of the pressing button 160 passes through the base plate 110 and the housing 200 and is exposed from the housing 200, and the other part of the pressing button 160 is limited by the base plate 110 and thus located in the housing 200. The one end of the pressing button 160 located in the housing 200 abuts against the connecting portion 141. An external object, such as a mobile device, can come into contact with the pressing button 160 exposed outside the housing 200 and further apply a force on the pressing button 160, such that the pressing button 160 moves towards the inside of the housing 200. FIG. 1 to FIG. 4 show a state of the pressing button 160 that moves towards the inside of the housing 200 and is pressed downwards at a maximum level. Since the pressing button 160 normally abuts against the connecting portion 141, the pressing button 160 pushes the connecting portion 141 when the pressing button 160 is pressed downwards, such that the connecting portion 141 pivotally rotates in reverse relative to the pivot shaft 130, further driving the covers 142 to pivotally rotate in reverse and expose the connectors 120. At this point in time, as shown in FIG. 1, the covers 142 are pivotally rotated in reverse and are withdrawn into the housing 200, that is, the covers 142 are at an open position, and the connectors 120 are completely exposed without any covering and can thus receive further connection of the connection interface of the mobile device.

Figure 5:
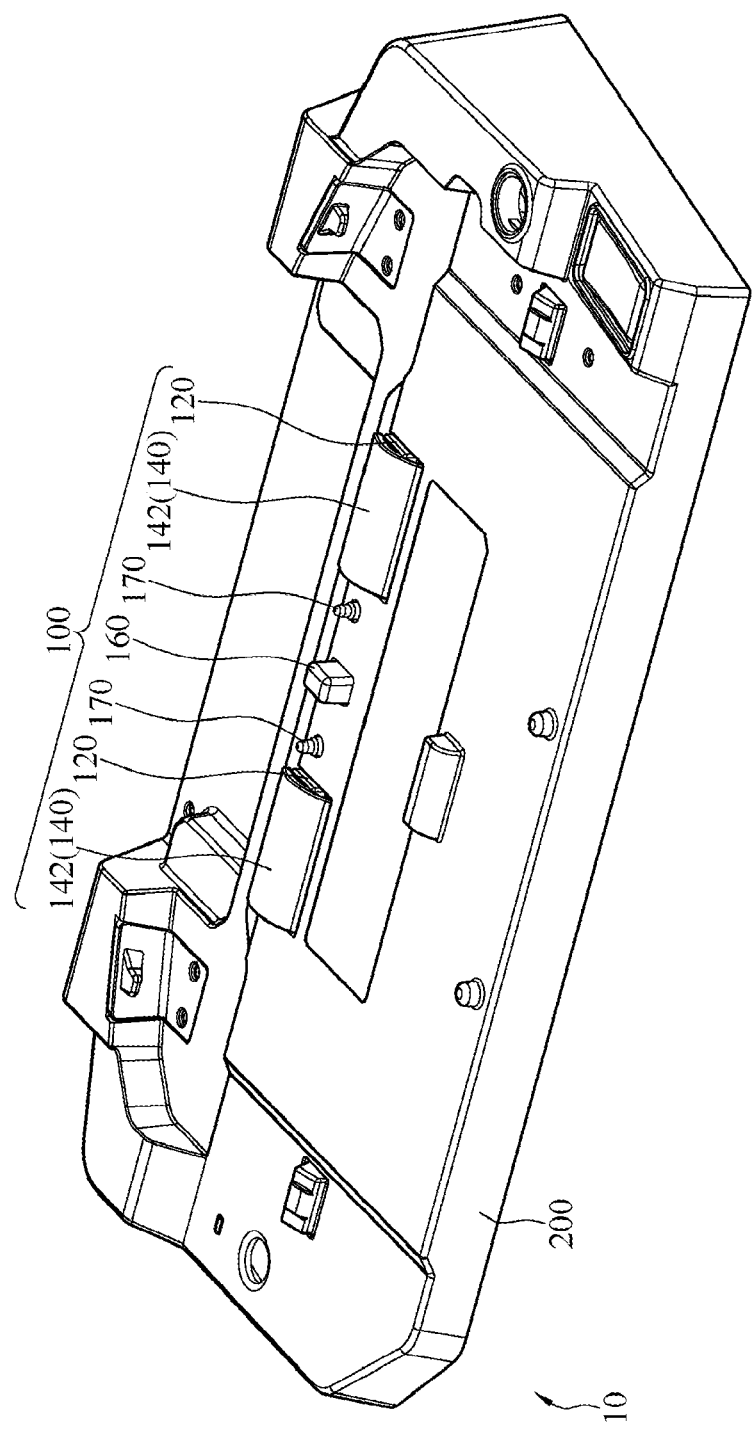
FIG. 5 is a schematic diagram of a protection cover of the connector protection device of the electronic device in FIG. 1, wherein the protection cover is in a closed state.
Figure 6:
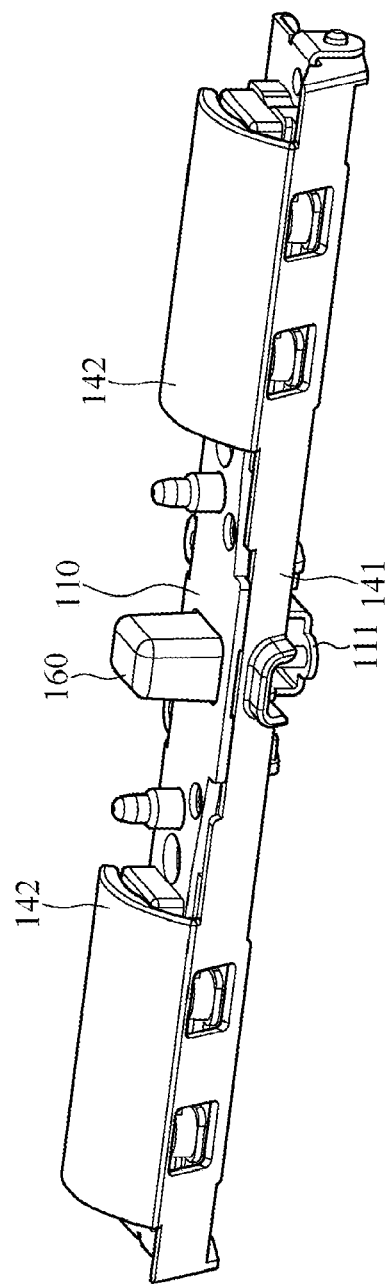
FIG. 6 is a schematic diagram of the connector protection device in FIG. 5.

Refer to FIG. 5 and FIG. 6. FIG. 5 shows a schematic diagram of the protection cover 140 of the connector protection device 100 of the electronic device 10 in FIG. 1, wherein the protection cover 140 is in a closed state. FIG. 6 shows a schematic diagram of the connector protection device 100 in FIG. 5. By comparing FIG. 1 to FIG. 4 with FIG. 5 and FIG. 6, the difference between an open state and a closed state of the protection cover 140 of the connector protection device 100 can be observed. When the protection cover 140 is in an open state as shown in FIG. 1 to FIG. 4, the covers 142 are located in the housing 200 and do not cover the connectors 120, and most part of the pressing button 160 is located in the housing 200; when the protection cover 140 is in a closed state as shown in FIG. 5 and FIG. 6, the covers 142 are located outside the housing 200 and cover the connectors 120, and most part of the pressing button 160 is located outside the housing 200.

When no mobile device is placed on the housing 200 of the electronic device 10, namely in a normal state in which the entire system does not receive any external force, the covers 142 are kept at the closed position because the torsion spring 150 persistently applies a force on the connecting portion 141 as described above, and the electronic device 10 is thus normally in the state shown in FIG. 5 and FIG. 6. If a user places a corresponding mobile device on the housing 200 of the electronic device 10, the pressing button 160 is pressed by the mobile device and becomes located inside the housing 200. Furthermore, during the process in which the pressing button 160 moves towards the inside of the housing 200, the pressing button 160 drives the connecting portion 141 as described above, such that the connecting portion 141 pivotally rotates in reverse and the covers 142 are withdrawn into the housing 200 along with the reverse pivotal rotation of the connecting portion 141. At this point in time, the electronic device 10 is in a state shown in FIG. 1 to FIG. 4. In other words, a user is required to only align the mobile device with the connectors 120 and place the mobile device on the housing 200, and the covers 142 are automatically opened up due to the mobile device placed without involving any additional operation, and the connection interface of the mobile device can then be connected unobstructedly to the connectors 120. After the user removes the mobile device from the electronic device 10, the covers 142 are automatically closed without involving any additional operation of the user.

As shown in FIG. 1 to FIG. 6, in this embodiment, the connector protection device 100 further includes two positioning columns 170 which are assembled on the base plate 110. The two positioning columns 170 are respectively located between the two connectors 120 and the pressing button 160, and extend to outside of the housing 200. The positioning columns 170 are provided correspondingly to positioning holes (not shown) of the mobile device. During the process that the user aligns the mobile device with the connectors 120 and places the mobile device on the housing 200, the positioning columns 170 enter the positioning holes. With the matching of the positioning columns 170 and the positioning holes, the positioning effect between the mobile device and the electronic device 10 is enhanced. Thus, the mobile device can move towards a predetermined direction through the positioning columns 170 and is prevented from deviation, so as to be reliably come into contact with and press the pressing button 160 downwards. Furthermore, the connection interface of the mobile device can also be reliably aligned and connected to the connectors 120.

As shown in FIG. 2 to FIG. 4, in this embodiment, the connecting portion 141 includes a first support arm 1411 that is protrudingly provided at the connecting portion 141 and extends towards the base plate 110, and the pivot shaft 130 is connected to the first support arm 1411. The first support arm 1411 pivotally rotates relative to the pivot shaft 130 by taking the pivot shaft 130 as a rotation axis, and the connecting portion 141 pivotally rotates relative to the pivot shaft 130 through the first support arm 1411. In this embodiment, the first support arm 1411 includes a first protruding column 1412, the torsion spring 150 is sleeved on the pivot shaft 130, and one end of the torsion spring 150 encircles the first protruding column 1412, that is, the elastic restoring force generated by the torsion spring 150 is applied on the connecting portion 141 through the first protruding column 1412. In this embodiment, the first support arm 1411 is in a quantity of two, and the pivot shaft 130 is in a quantity of two. Two second support arms 1413 and two second pivot shafts 130 are mutually symmetrically arranged, the two pivot shafts 130 are respectively connected to the two first support arms 1411, and the pressing button 160 is located between the two first support arms 1411 and the two pivot shafts 130.

As shown in FIG. 2 to FIG. 4 and FIG. 6, in this embodiment, the connector protection device 100 further includes an outer pivot shaft 131, the connecting portion 141 includes a second support arm 1413, and the second support arm 1413 is protrudingly provided at the connecting portion 141 and extends towards the base plate 110. The base plate 110 and the second support arm 1413 are connected to the outer pivot shaft 131, and the outer pivot shaft 131 and the pivot shaft 130 are coaxial. In this embodiment, the outer pivot shaft 131 is, for example but not limited to, protrudingly provided on the second support arm 1413. In this embodiment, the second support arm 1413 is in a quantity of two, the outer pivot shaft 131 is in a quantity of two, and the two outer pivot shafts 131 are respectively connected to the two second support arms 1413. The two second support arms 1413 and the two outer pivot shafts 131 are respectively located on two opposite ends of the connecting portion 141, the two outer pivot shafts 131 are respectively pivotally connected to two opposite ends of the base plate 110, and the two first support arms 1411 are located between the two second support arms 1413.

Figure 7:
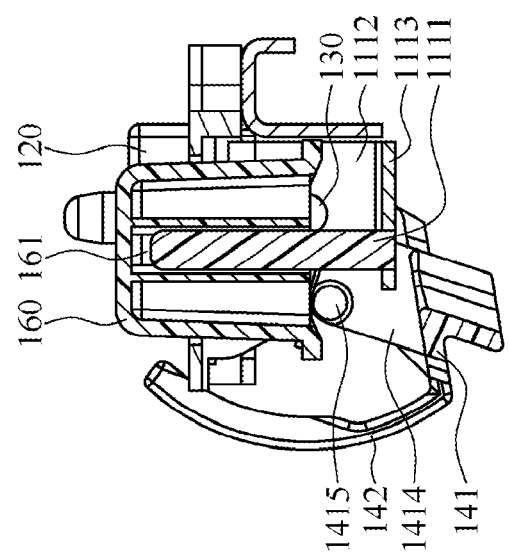
FIG. 7 is a cross-sectional view of the connector protection device in FIG. 4 along a dotted line 7-7.

Refer to FIG. 7 and FIG. 8. FIG. 7 shows a cross-sectional view of the connector protection device 100 in FIG. 4 along a dotted line 7-7, wherein the protection cover 140 of the connector protection device 100 in FIG. 7 is in an open state. FIG. 8 shows a cross-sectional view of the protection cover 140 in FIG. 7 changed to a closed state. As shown in FIG. 2 to FIG. 4, FIG. 7 and FIG. 8, in this embodiment, the connecting portion 141 includes a third support arm 1414 that is protrudingly provided at the connecting portion 141 and extends towards the pressing button 160. The third support arm 1414 includes a second protruding column 1415, and one end of the pressing button 160 abuts against the second protruding column 1415. In other words, the pressing button 160 and the connecting portion 141 come into contact with each other and drive each other through the second protruding column 1415. In this embodiment, the third support arm 1414 is in a quantity of two, the two third support arms 1414 are mutually symmetrically arranged, two second protruding columns 1415 extend from the respective third support arms 1414 and towards each other, and one end of the pressing button 160 simultaneously abuts against the two second protruding columns 1415.

As shown in FIG. 5, FIG. 6 and FIG. 8, when the pressing button 160 does not receive an external force, the pressing button 160 is pushed by the second protruding column 1415 towards the outside of the housing 200 because the torsion spring 150 persistently applies a force on the connecting portion 141. Thus, the pressing button 160 extends at a maximum level out of the housing 200. As shown in FIG. 1 to FIG. 4 and FIG. 7, when the pressing button 160 is pressed downwards, the pressing button 160 correspondingly presses the second protruding column 1415 downwards. At this point in time, the second protruding column 1415 rotates by taking the pivot shaft 130 as a rotation axis, and drives the connecting portion 141 and the covers 142 to pivotally rotate in reverse. When the pressing button 160 is pressed at a maximum level to the inside of the housing 200, the covers 142 are also completely withdrawn into the housing 200.

As shown in FIG. 2 to FIG. 4 and FIG. 6 to FIG. 8, in this embodiment, the base plate 110 includes a limiting portion 111, the limiting portion 111 is located between the two connectors 120, the pressing button 160 is movably provided in the limiting portion 111, and the limiting portion 111 causes the displacement stroke of the pressing button 160 to be limited to one single direction. The limiting portion 111 and the connecting portion 141 are connected to the pivot shaft 130, and the connecting portion 141 is configured to rotate by taking the pivot shaft 130 as an axis. For example, the limiting portion 111 is fixed at the base plate 110, the pivot shaft 130 is fixed at the limiting portion 111, and the connecting portion 141 is pivotally connected to the pivot shaft 130 through the first support arm 1411. As shown in FIG. 4, FIG. 7 and FIG. 8, in this embodiment, the limiting portion 111 includes a limiting column 1111, and the pressing button 160 is sleeved on the limiting column 1111. The limiting portion 111 further includes two side plates 1112 and a bridge plate 1113. The bridge plate 1113 is located between the two side plates 1112, the two side plates 1112 are connected to the base plate 110, and the two pivot shafts 130 are connected to the two side plates 1112. The limiting column 1111 is provided on the bridge plate 1113, the pressing button 160 is located between the two side plates 1112, and the limiting column 1111 extends from the bridge plate 1113 into the pressing button 160. As shown in FIG. 7 and FIG. 8, the pressing button 160 includes a limiting groove 161, and the shape of the limiting groove 161 matches the shape of the limiting column 1111. With the matching of the limiting column 1111 and the limiting groove 161, the displacement stroke of the pressing button 160 is limited to one single direction, and thus the pressing button 160 is more stable when the pressing button 160 is moved (pressed downwards or lifted).

Figure 9:
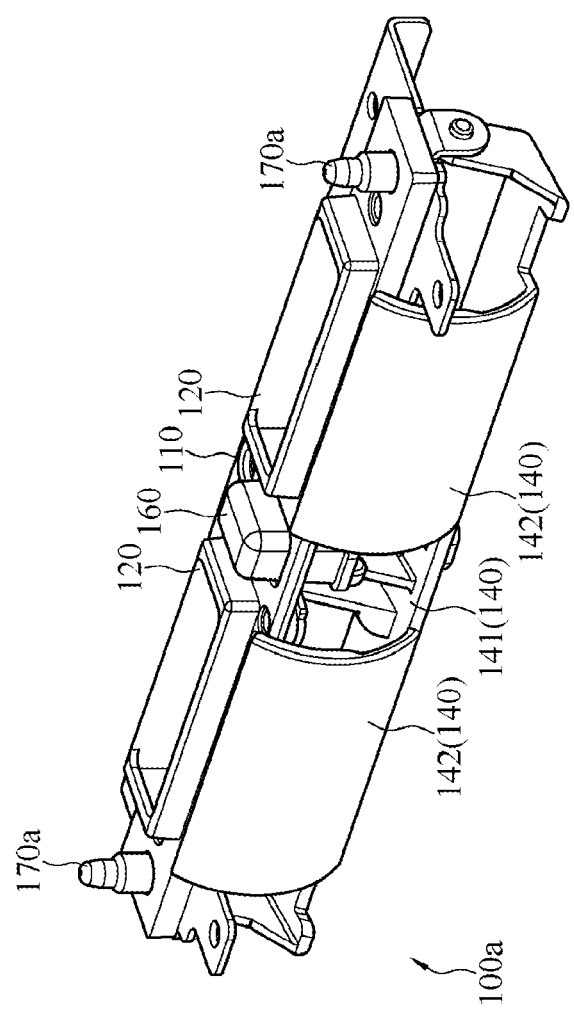
FIG. 9 is a schematic diagram of a connector protection device according to another embodiment of the present invention.

Refer to FIG. 9. FIG. 9 shows a schematic diagram of a connector protection device 100a according to another embodiment of the present invention. The connector protection device 100a in FIG. 9 differs from the connector protection device 100 in FIG. 1 to FIG. 8 in that, the position of a positioning column 170a of the connector protection device 100a is different from that of the positioning column 170 of the connector protection device 100. More specifically, the positioning column 170a can match a corresponding positioning hole of a specific mobile device. As shown in FIG. 9, in this embodiment, the positioning column 170a is in a quantity of two, the two positioning columns 170a are located on two opposite sides of the base plate 110, and the two connectors 120 and the pressing button 160 are located between the two positioning columns 170a.

In some embodiments, the position and quantity of the positioning column 170 and the position and quantity of the connector 120 may be changed according to a mobile device applicable to the electronic device 10. Furthermore, the covers 142 of the protection cover 140 may also be changed in regard to the position and quantity of the connector 120.

In conclusion, in regard to the connector protection device according to the embodiments of the present invention, when a user places a mobile device to an electronic device having such connector protection device, the covers of the connector protection device are automatically opened to expose the connectors without involving any additional operation of the user, thus providing ease of use. Furthermore, when the user removes the mobile device from the electronic device, the covers are automatically closed and cover the connectors, avoiding damage of the connectors caused by collisions when the connectors are not in use. In addition, the covers also prevent dust from accumulating in the connectors.

While the present invention has been disclosed in the above embodiments, it is to be understood that the present invention is not limited thereto. Modifications and variations can be made by a person skilled in the art without departing from the spirit and scope of the present invention. Therefore, the scope of the patent protection of the present invention should be defined by appended claims.

What is claimed is:

1. A connector protection device having an automatic closing function, comprising:
   a base plate;
   two connectors, assembled at the base plate;
   a pivot shaft, assembled at the base plate;
   a protection cover, comprising a connecting portion and two covers, the connecting portion assembled at the pivot shaft, each of the covers corresponding to one of the connectors;
   a torsion spring, assembled at the pivot shaft, having one end thereof abutting against the base plate and one other end thereof abutting against the connecting portion; and
   a pressing button, provided between the two covers, having one end thereof abutting against the connecting portion;
   wherein the torsion spring applies a force on the connecting portion such that the covers tilt above and cover the connectors; when the pressing button is pressed downwards, the pressing button pushes the connecting portion to pivotally rotate in reverse, further driving the covers to pivotally rotate in reverse to expose the connectors.

2. The connector protection device according to claim 1, further comprising two positioning columns, and the two positioning columns are assembled on the base plate and are respectively located between the two connectors and the pressing button.

3. The connector protection device according to claim 1, wherein the base plate comprises a limiting portion that is located between the two connectors, and the pressing button is movably provided in the limiting portion.

4. The connector protection device according to claim 3, wherein the limiting portion and the connecting portion are connected to the pivot shaft, and the connecting portion is configured to rotate by taking the pivot shaft as an axis.

5. The connector protection device according to claim 3, wherein the limiting portion comprises a limiting column, and the pressing button is sleeved on the limiting column.

6. The connector protection device according to claim 5, wherein the limiting portion further comprises two side plates and a bridge plate, the bridge plate is located between the two side plates, the two side plates are connected to the base plate, and the limiting column is provided on the bridge plate.

7. The connector protection device according to claim 1, wherein the connecting portion comprises a first support arm, and the pivot shaft is connected to the first support arm.

8. The connector protection device according to claim 7, wherein the first support arm comprises a first protruding column, the torsion spring is sleeved on the pivot shaft, and one end of the torsion spring encircles the first protruding column.

9. The connector protection device according to claim 7, wherein the first support arm is in a quantity of two, the pivot shaft is in a quantity of two, the two pivot shafts are respectively connected to the two first support arms, and the pressing button is located between the two first support arms and the two pivot shafts.

10. The connector protection device according to claim 9, further comprising an outer pivot shaft; wherein the connecting portion comprises a second support arm, the base plate and the second support arm are connected to the outer pivot shaft, and the outer pivot shaft and the pivot shaft are coaxial.

11. The connector protection device according to claim 10, wherein the second support arm is in a quantity of two, the outer pivot shaft is in a quantity of two, the two outer pivot shafts are respectively connected to the two second support arms, and the two first support arms are located between the two second support arms.

12. The connector protection device according to claim 1, wherein the connecting portion comprises a third support arm that comprises a second protruding column, and one end of the pressing button abuts against the second protruding column.

13. The connector protection device according to claim 12, wherein the third support arm is in a quantity of two, the two second protruding columns extend from the respective third support arms and towards each other, and one end of the pressing button abuts against the two second protruding columns.

* * * * *